US 9,510,372 B2

(12) United States Patent
Cho et al.

(10) Patent No.: US 9,510,372 B2
(45) Date of Patent: Nov. 29, 2016

(54) METHOD AND APPARATUS FOR ESTABLISHING DEVICE-TO-DEVICE CONNECTION IN WIRELESS COMMUNICATION SYSTEM

(71) Applicant: LG ELECTRONICS INC., Seoul (KR)

(72) Inventors: Heejeong Cho, Anyang-si (KR); Eunjong Lee, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 14/395,784

(22) PCT Filed: Apr. 15, 2013

(86) PCT No.: PCT/KR2013/003117
§ 371 (c)(1),
(2) Date: Oct. 20, 2014

(87) PCT Pub. No.: WO2013/162196
PCT Pub. Date: Oct. 31, 2013

(65) Prior Publication Data
US 2015/0085747 A1    Mar. 26, 2015

Related U.S. Application Data

(60) Provisional application No. 61/639,096, filed on Apr. 27, 2012.

(51) Int. Cl.
*H04W 76/02*    (2009.01)
*H04W 4/00*    (2009.01)
*H04W 48/14*    (2009.01)

(52) U.S. Cl.
CPC .............. *H04W 76/02* (2013.01); *H04W 4/008* (2013.01); *H04W 48/14* (2013.01); *H04W 76/023* (2013.01)

(58) Field of Classification Search
CPC . H04W 76/023; H04W 76/02; H04W 48/14; H04W 4/008
See application file for complete search history.

(56) References Cited

U.S. PATENT DOCUMENTS

| 2010/0009675 | A1* | 1/2010 | Wijting | H04W 72/02 455/426.1 |
| 2011/0098043 | A1* | 4/2011 | Yu | H04W 60/00 455/435.1 |

(Continued)

FOREIGN PATENT DOCUMENTS

| KR | 10-2009-0005647 | | 1/2009 | |
| KR | WO 2011/118912 | * | 9/2011 | ............... H04B 7/26 |

(Continued)

OTHER PUBLICATIONS

PCT International Application No. PCT/KR2013/003117, Written Opinion of the International Searching Authority dated Jul. 26, 2013, 1 page.

*Primary Examiner* — Jae Y Lee
(74) *Attorney, Agent, or Firm* — Lee, Hong, Degerman, Kang & Waimey

(57) ABSTRACT

A method and apparatus for establishing a device-to-device (D2D) connection in a wireless communication system is provided. A first device may establish the D2D connection with a second device. The first device only knows information on neighbor devices of the first device, and a network does not know the information on neighbor devices of the first device. The first device determines whether to establish the D2D connection with the second device or not, based on at least one of a proximity between the first device and the second device based on a profile of the second device obtained through a neighbor discovery procedure, a presence of data to be transmitted to the second device, and a preference for the D2D connection of the first device.

12 Claims, 7 Drawing Sheets

(56) References Cited

U.S. PATENT DOCUMENTS

| | | |
|---|---|---|
| 2011/0246577 A1 | 10/2011 | Self |
| 2011/0317569 A1 | 12/2011 | Kneckt et al. |
| 2013/0029675 A1* | 1/2013 | Kwon .................. H04W 72/04 455/450 |
| 2013/0029713 A1* | 1/2013 | Jang ..................... H04W 24/10 455/517 |
| 2013/0170414 A1* | 7/2013 | Kwon ................. H04W 72/042 370/311 |
| 2013/0288645 A1* | 10/2013 | Zheng ............... H04W 72/0446 455/411 |
| 2014/0120907 A1* | 5/2014 | Yu ...................... H04W 76/023 455/426.1 |
| 2014/0206322 A1* | 7/2014 | Dimou .................. H04W 4/005 455/414.1 |
| 2015/0133133 A1* | 5/2015 | Isobe .................... H04W 68/00 455/450 |

FOREIGN PATENT DOCUMENTS

| | | | |
|---|---|---|---|
| KR | WO 2011/132818 | * 10/2011 | ............... H04B 7/24 |
| WO | 2011/019595 | 2/2011 | |
| WO | 2011/109027 | 9/2011 | |

* cited by examiner

METHOD AND APPARATUS FOR ESTABLISHING DEVICE-TO-DEVICE CONNECTION IN WIRELESS COMMUNICATION SYSTEM

CROSS-REFERENCE TO RELATED APPLICATIONS

This application is the National Stage filing under 35 U.S.C. 371 of International Application No. PCT/KR2013/003117, filed on Apr. 15, 2013, which claims the benefit of U.S. Provisional Application Ser. No. 61/639,096, filed on Apr. 27, 2012, the contents of which are hereby incorporated by reference herein in their entirety.

BACKGROUND OF THE INVENTION

1. Field of the Invention

The present invention relates to wireless communications, and more particularly, to a method and apparatus for establishing a device-to-device (D2D) connection in a wireless communication system.

2. Related Art

In next generation multimedia mobile communication systems, which have been actively studied in recent years, there is a demand for a system capable of processing and transmitting a variety of information (e.g., video and radio data) in addition to the early-stage voice service. Further, a 3rd generation wireless communication system is followed by a 4th generation wireless communication which is currently being developed aiming at supporting a high-speed data service of 1 gigabits per second (Gbps) in downlink and 500 megabits per second (Mbps) in uplink. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment, etc. Therefore, various techniques have been developed to overcome the abnormal characteristic of the wireless channel and to increase reliability of wireless communication.

Meanwhile, with the advent of a ubiquitous environment, there is a rapid increase in a demand for receiving a seamless service anytime anywhere by using equipments. In order to satisfy such a demand, a device-to-device (D2D) connection technique may be introduced in a wireless communication system. The D2D connection technique refers to a technique for transmitting and receiving data not via a base station (BS) since devices such as a user equipment (UE) or the like are connected to each other. That is, one device can communicate with another device via the BS, and can directly communicate with another device not via the BS. By using the D2D connection technique, such an effect as low power consumption, throughput enhancement, etc., can be obtained.

Various scenarios may exist to establish the D2D connection. There may be a D2D connection scenario on the basis of whether the D2D connection establishment is initiated by the BS or each device. In addition, there may be a D2D connection scenario on the basis of whether information regarding another device neighboring to a specific device is known to the BS and/or the specific device.

There is a need for a method of effectively establishing a D2D connection when a network does not know information on neighbor devices of a specific device and only the specific device knows the information on the neighbor devices of the specific device.

SUMMARY OF THE INVENTION

The present invention provides a method and apparatus for establishing a device to device (D2D) connection in a wireless communication system. The present invention provides various scenarios for establishing a D2D connection when only a specific device knows information on neighbor devices of the specific device in a wireless communication system.

In an aspect, a method for establishing, by a first device, a device-to-device (D2D) connection with a second device in a wireless communication system is provided. The method includes determining whether to establish the D2D connection with the second device or not, based on at least one of a proximity between the first device and the second device based on a profile of the second device obtained through a neighbor discovery procedure, a presence of data to be transmitted to the second device, and a preference for the D2D connection of the first device, transmitting a first connection establishment request message to request of the D2D connection establishment to a network if it is determined to establish the D2D connection with the second device, receiving a first connection establishment response message indicating whether the request of the D2D connection establishment is accepted or rejected, from the network, and requesting the D2D connection establishment to the second device if the request of the D2D connection establishment is accepted by the network.

In another aspect, a method for establishing, by a first device, a device-to-device (D2D) connection with a second device in a wireless communication system is provided. The method includes determining whether to establish the D2D connection with the second device or not, based on at least one of a proximity between the first device and the second device based on a profile of the second device obtained through a neighbor discovery procedure, a presence of data to be transmitted to the second device, and a preference for the D2D connection of the first device, transmitting a connection establishment request message to request of the D2D connection establishment to the second device if it is determined to establish the D2D connection with the second device, receiving a connection establishment response message indicating whether the request of the D2D connection establishment is accepted or rejected, from the second device, transmitting a connection establishment confirm message to the second device if the request of the D2D connection establishment is accepted by the second device, and transmitting a connection establishment setup report message to a network.

A D2D connection is efficiently established.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

Figure 1:
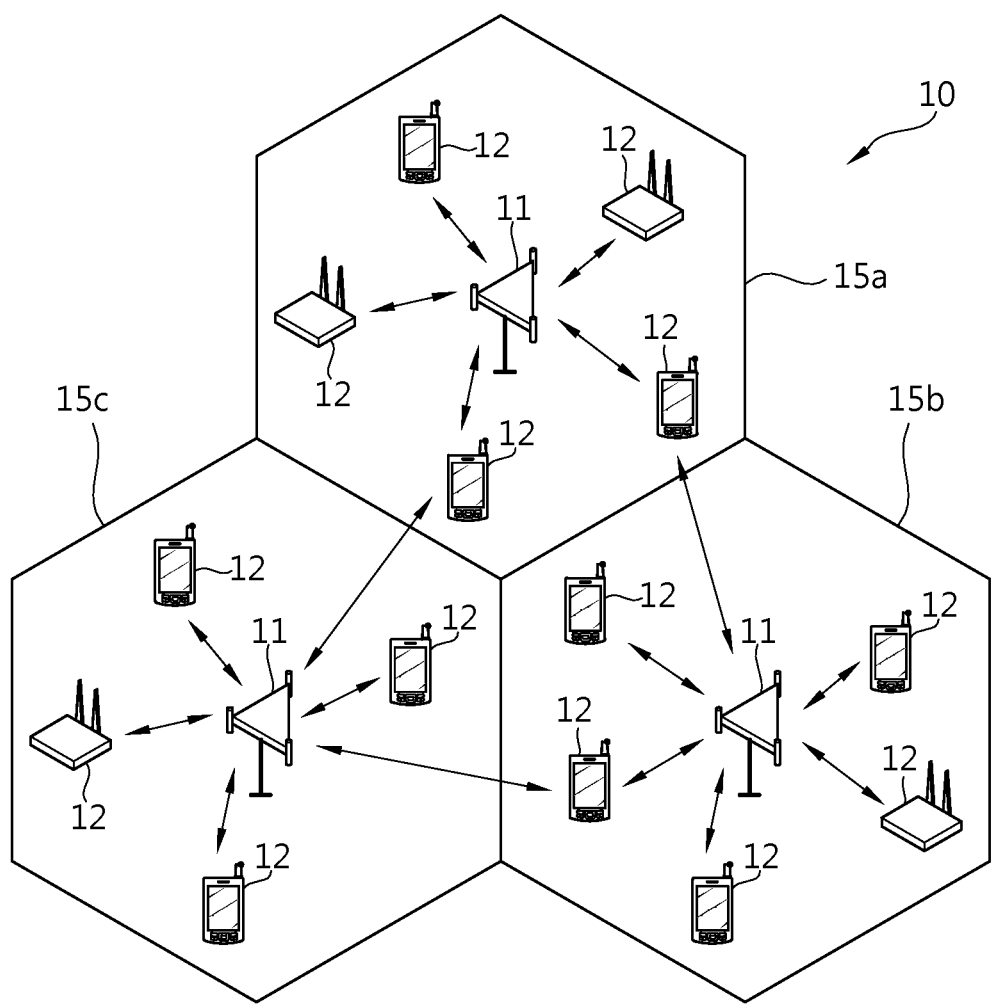
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

A device-to-device (D2D) connection technique can be employed in a wireless communication system. The D2D connection technique refers to a technique for transmitting and receiving data not via a BS since devices such as a user equipment (UE) or the like are connected to each other. There may be various scenarios for establishing the D2D connection.

Figure 2:
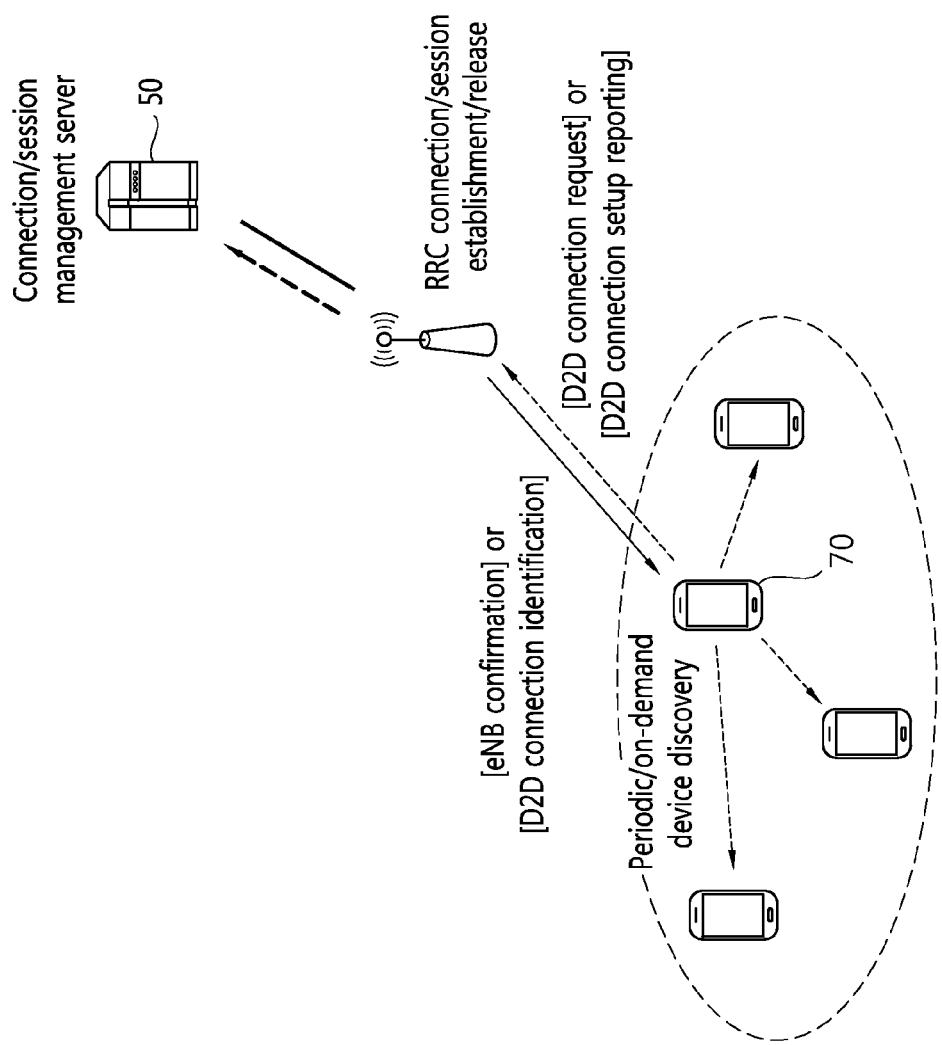
FIG. 2 shows an example of a D2D connection scenario according to an embodiment of the present invention.

FIG. 2 shows an example of a D2D connection scenario according to an embodiment of the present invention.

It is assumed in FIG. 2 that only a specific device knows information on neighbor devices of the specific device. The specific device may use a neighbor discovery procedure to know information on neighbor devices or to determine a proximity between devices. The network cannot know the information on neighbor devices of the specific device. In such a scenario, a D2D connection establishment can be initiated only by the specific device, and cannot be initiated by the network. Upon receiving an uplink (UL) packet transmitted from each device, the network can perform the D2D connection establishment procedure.

Referring to FIG. 2, a device 70 can perform the neighbor discovery procedure either periodically or on demand of an eNB. The device 70 can transmit a D2D connection request or D2D connection setup reporting to an eNB 60 on the basis of information regarding neighbor devices and acquired through the neighbor discovery procedure. Upon receiving the D2D connection request or the D2D connection setup reporting, the eNB 60 can transmit an eNB confirmation or a D2D connection identification to the device 70. Accordingly, the D2D connection can be established. The eNB 60 can instruct a connection/session management server 50 to establish/release a radio resource control (RRC) connection/session.

After the D2D connection establishment is complete, the device 70 can transmit and receive data directly, not via the eNB 60. In this case, a D2D resource used by the device 70 to directly transmit and receive the data may be independent of or shared with a B2D resource for data transmission and reception between the existing device 70 and the eNB 60.

Hereinafter, a D2D connection establishment method will be described according to an embodiment of the present invention. If a device initiates the D2D connection establishment, the device can request a network to perform the D2D connection establishment by determining a proximity with a communication target device determined on the basis of a neighbor device's profile acquired through a neighbor discovery procedure, a presence of data to be transmitted and received with respect to the target device, a preference of the D2D connection establishment, etc.

Figure 3:
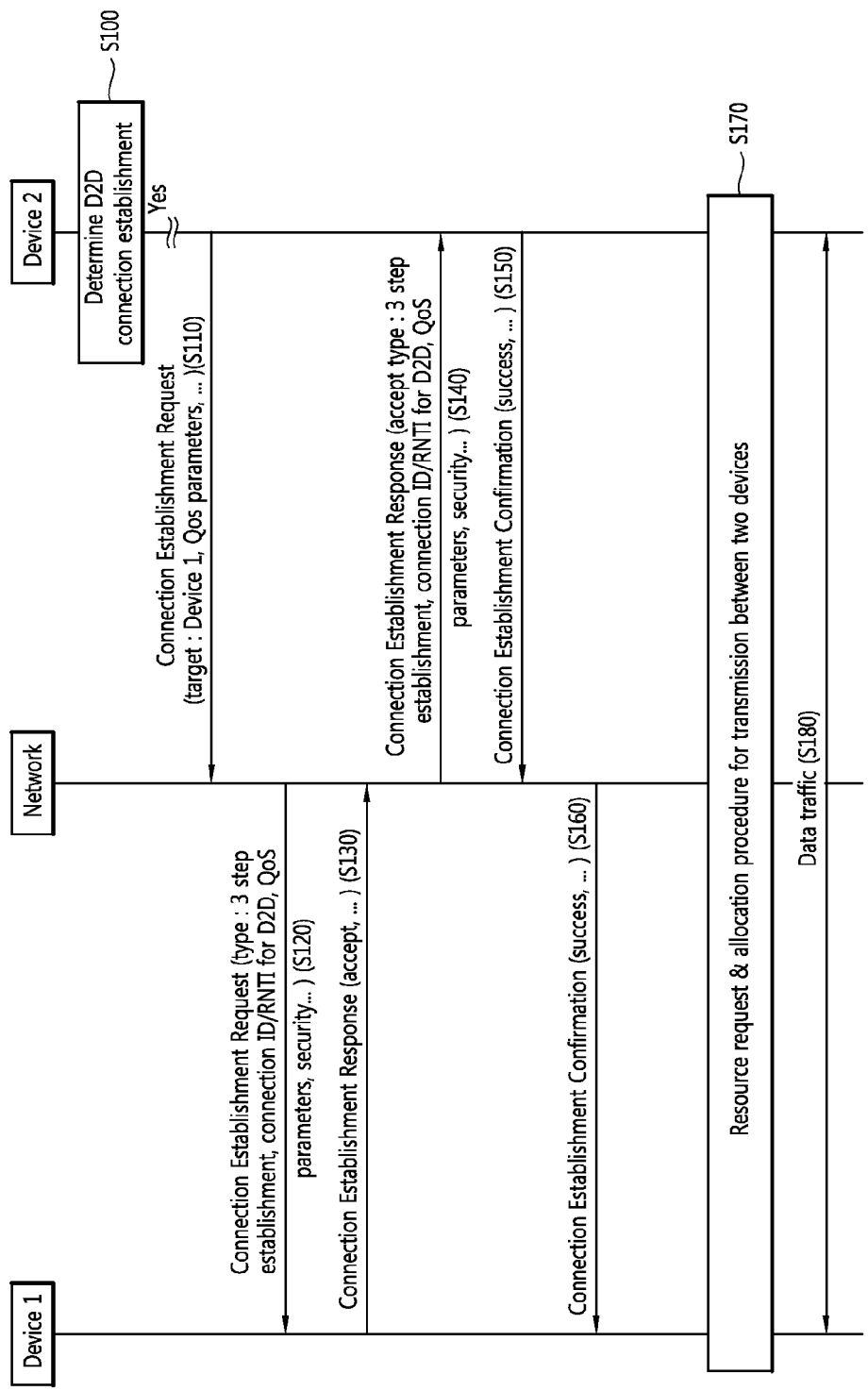
FIG. 3 shows an example of a D2D connection establishment method according to an embodiment of the present invention.

FIG. 3 shows an example of a D2D connection establishment method according to an embodiment of the present invention. The embodiment of FIG. 3 shows a case in which, when a D2D connection establishment is initiated by a device, the D2D connection establishment procedure is achieved in three steps.

Referring to FIG. 3, a device 2 determines whether to establish a D2D connection in step S100. The device 2 can request a network to perform the D2D connection establishment by determining a proximity to a communication target device, a presence of data to be transmitted and received with respect to the target device, a preference for the D2D connection establishment, etc, determined on the basis of neighbor devices' profiles acquired through a neighbor discovery procedure. It is assumed in the embodiment of FIG. 3 that the target device is a device 1.

In step S110, the device 2 transmits a first connection establishment request message to the network. The first connection establishment request message may include information on the target device to which a D2D connection is established and a QoS parameter for the D2D connection. The information of the target device may be any one of a cell radio network temporary identifier (C-RNTI), an STID, etc, assigned by the network. The QoS parameter for the D2D connection indicates QoS information requested for the D2D connection by the device 2.

Upon receiving the first connection establishment request message, the network transmits a second connection establishment request message to the device 1 which is the target device of the D2D connection in step S120. The second connection establishment request message may include a connection establishment type, information of each device, a QoS parameter for the D2D connection, security information, a D2D identifier, etc. The connection establishment type indicates a 3-step D2D connection establishment procedure. The information of each device indicates information of devices to which the D2D connection establishment is established. The information of each device may be any one of each device's C-RNTI, STID, etc, assigned by the network.

The D2D identifier indicates an identifier of the D2D connection to be established between the device 1 and the device 2. The D2D identifier may be a link level D2D identifier. The link level D2D identifier is an identifier assigned to a connection for recognizing each UE, and is an identifier assigned to a physical connection between the devices. Only one logical link may exist between the devices. Therefore, the link level D2D identifier may be unique in a specific area. In IEEE 802.16, the link level D2D identifier may be an STID. In 3GPP LTE-A, the link level D2D identifier may be an RNTI. Alternatively, the D2D identifier may be a connection/flow level D2D identifier. The connection/flow level D2D identifier is an identifier assigned to one or more service flows that can be established between the devices, and is an identifier assigned to a logical connection between the devices. A plurality of connections or flows each of which has a different property may exist between the devices. In IEEE 802.16, the connection/flow level D2D identifier may be a flow ID or connection ID in a media access control (MAC) layer. In 3GPP LTE-A, the connection/flow level D2D identifier may be a logical channel ID (LCID) in an MAC layer or a distributed resource block (DRB) identity in a radio link control (RLC) layer. Meanwhile, the D2D identifier may also be used in resource allocation for data transmission and reception after the D2D connection establishment is complete.

Upon receiving the second connection establishment request message, the device 1 transmits a first connection establishment response message to the network in step S130. The connection establishment response message indicates an acceptance or rejection on a D2D connection establishment request of the device 2. The embodiment of FIG. 3 shows a case in which the device 1 accepts the D2D connection establishment request of the device 2.

Upon receiving the first connection establishment response message, the network transmits a second connection establishment response message to the device 2 in step S140. The second connection establishment response message may include an acceptance or rejection on the D2D connection establishment request of the device 1, a connection establishment type for indicating a D2D connection establishment procedure consisting of 3 steps, a QoS parameter for the D2D connection, security information, a D2D identifier, etc. The embodiment of FIG. 3 shows a case in which the network accepts the D2D connection establishment request of the device 2. The QoS parameter for the D2D connection may be included when QoS information requested for the D2D connection by the network is preferential over QoS information requested by the device 2.

Upon receiving the second connection establishment response message, the device 2 transmits a first connection establishment confirmation message to the network in step S150. The first connection establishment confirmation message indicates whether a D2D connection establishment is finally successful according to the acceptance or rejection on the D2D connection establishment request of the device 1. Since the device 1 accepts the D2D connection establishment request in the embodiment of FIG. 3, the connection establishment confirmation message indicates the success of the D2D connection establishment.

Upon receiving the first connection establishment confirmation message, the network transmits a second connection establishment confirmation message to the device 1 in step S160. The second connection establishment confirmation message also indicates the success of the D2D connection establishment. The second connection establishment confirm message may be transmitted to the device 1 in a unicast manner. Or, when there are multiple devices which intend to establish the D2D connection with the device 2, the second connection establishment confirm message may be transmitted to the corresponding devices in a multicast manner by using the D2D identifier transmitted through the connection establishment request message.

In step S170, the device 1 and the device 2 perform a resource request and allocation procedure for data transmission. A D2D identifier transmitted by using the connection establishment request message can be used in a resource allocation. In the resource allocation is complete between the device 1 and the device 2, the device 1 and the device 2 transmit and receive data traffic in step S680.

Figure 4:
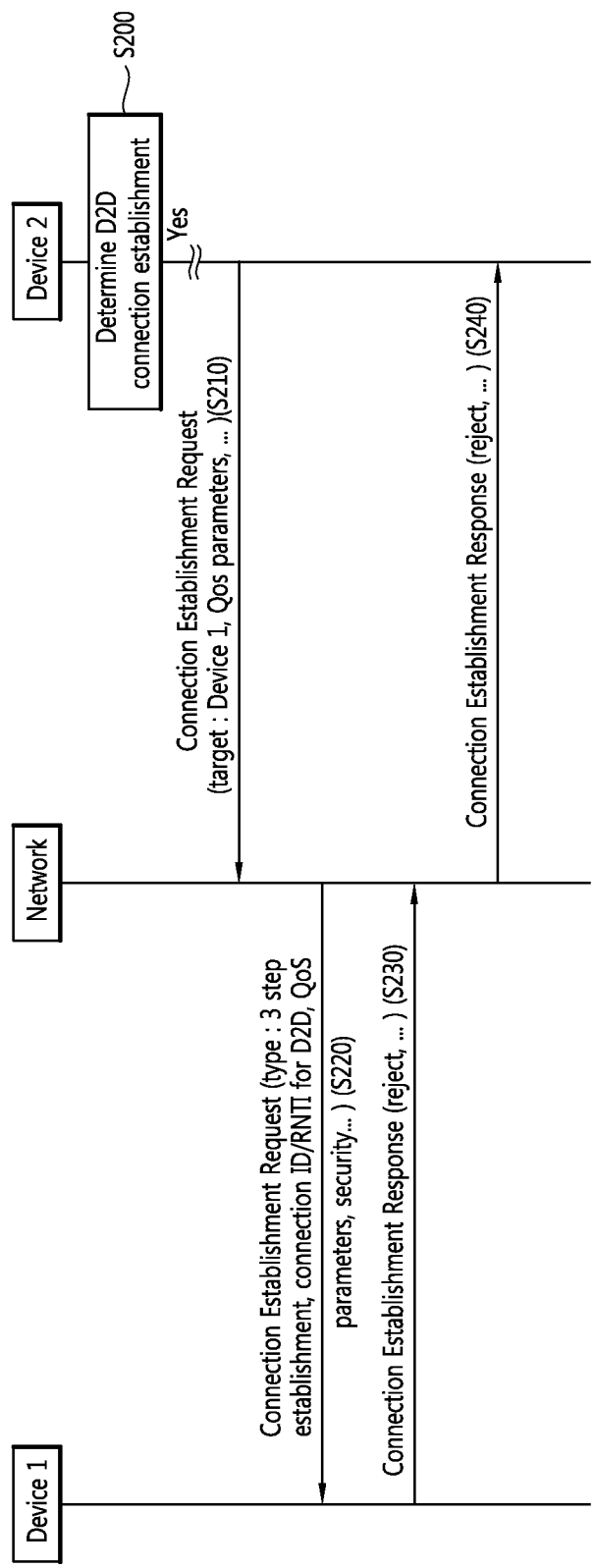
FIG. 4 shows another example of a D2D connection establishment method according to an embodiment of the present invention.

FIG. 4 shows another example of a D2D connection establishment method according to an embodiment of the present invention. The embodiment of FIG. 4 shows a case in which, when a D2D connection establishment is initiated by a device, the D2D connection establishment procedure is achieved in three steps.

Referring to FIG. 4, a device 2 determines whether to establish a D2D connection in step S200. The device 2 can request a network to perform the D2D connection establishment by determining a proximity to a communication target device, a presence of data to be transmitted and received with respect to the target device, a preference of the D2D connection establishment, etc, determined on the basis of neighbor devices' profiles acquired through a neighbor discovery procedure. It is assumed in the embodiment of FIG. 4 that the target device is a device 1.

In step S210, the device 2 transmits a first connection establishment request message to the network. The first connection establishment request message may include information on the target device to which a D2D connection is established and a QoS parameter for the D2D connection. The QoS parameter for the D2D connection indicates QoS information requested for the D2D connection by the device 2.

Upon receiving the first connection establishment request message, the network transmits a second connection establishment request message to the device 1 which is the target device of the D2D connection in step S220. The second connection establishment request message may include a connection establishment type for indicating a D2D connection establishment procedure consisting of 3 steps, information of the device 2, a QoS parameter for the D2D connection, security information, a D2D identifier, etc. In step S230, the device 1 transmits a first connection establishment response message to the network. The connection establishment response message indicates an acceptance or rejection on a D2D connection establishment request of the device 2. The embodiment of FIG. 4 shows a case in which the device 1 rejects the D2D connection establishment request of the device 2.

Upon receiving the first connection establishment response message, the network transmits a second connection establishment response message to the device 2 in step S240. The second connection establishment response message indicates that the device 1 rejects the D2D connection establishment request of the device 1. Although it is exemplified in the embodiment of FIG. 9 that the device 1 rejects the D2D connection establishment request, the D2D connection establishment request may be rejected by the network. In this case, instead of transmitting the first request connection establishment message to the device 1, the network may directly indicate to the device 2 that the network rejects the D2D connection establishment request by using the first connection establishment response message.

The network can allocate an uplink resource while transmitting the first/second connection establishment response message. That is, since the D2D connection establishment request of the device 2 is rejected, a network-based data transmission mechanism can be used again. Information on an uplink resource such as a resource allocation time or the like can be transmitted by using the first/second connection establishment response message. The device 2 can use the allocated uplink resource to request the uplink resource to the network or can transmit data, which is to be transmitted to the device 1, to the network.

Figure 5:
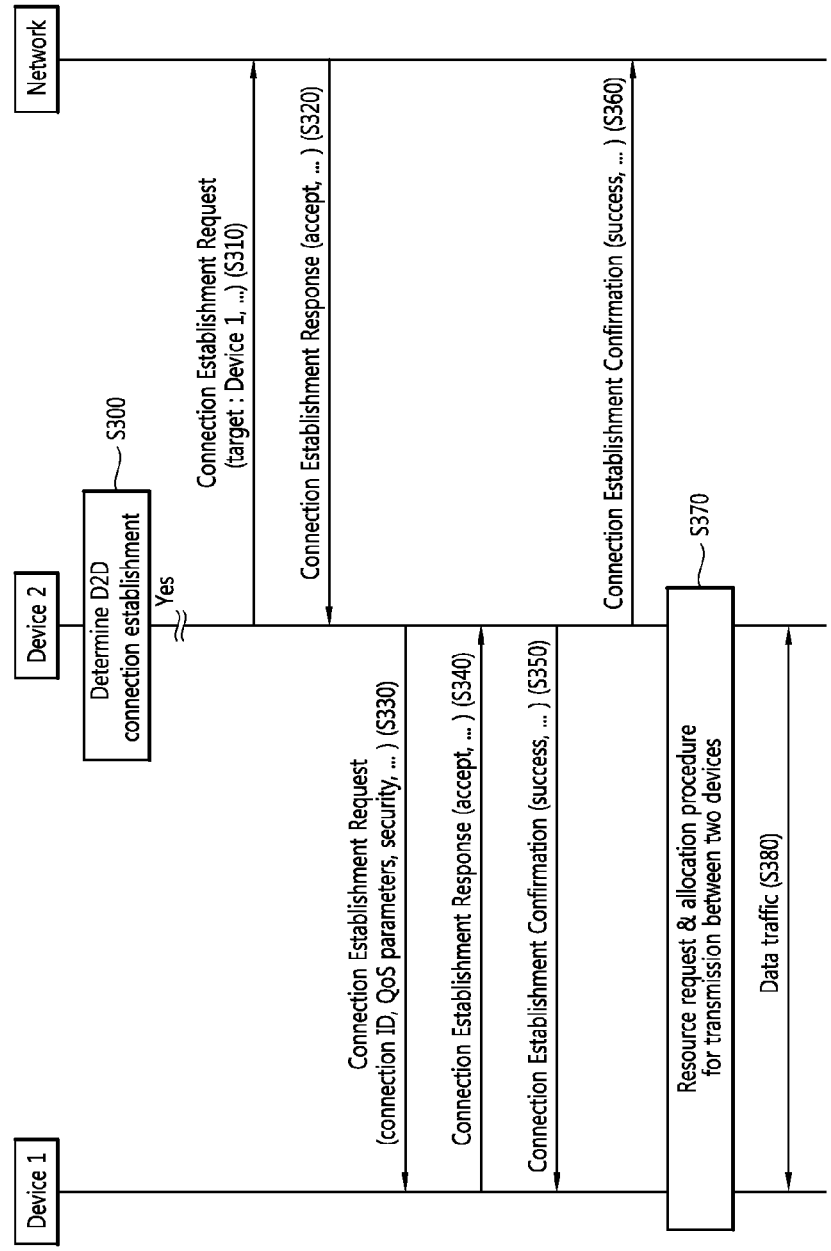
FIG. 5 shows another example of a D2D connection establishment method according to an embodiment of the present invention.

FIG. 5 shows another example of a D2D connection establishment method according to an embodiment of the present invention. The embodiment of FIG. 5 shows a case in which, when a D2D connection establishment is initiated by a device, the D2D connection establishment procedure is achieved in three steps.

Referring to FIG. 5, a device 2 determines whether to establish a D2D connection in step S300. The device 2 can request a network to perform the D2D connection establishment by determining a proximity with a communication target device, a presence of data to be transmitted and received with respect to the target device, a preference of the D2D connection establishment, etc, determined on the basis of a neighbor device's profile acquired through a neighbor discovery procedure. It is assumed in the embodiment of FIG. 5 that the target device is a device 1.

In step S310, the device 2 transmits a first connection establishment request message to a network. The first connection establishment request message may include information on a target device to which a D2D connection is established and a QoS parameter for the D2D connection. The QoS parameter for the D2D connection indicates QoS information requested for the D2D connection by the device 2.

Upon receiving the first connection establishment request message, the network transmits a first connection establishment response message to the device 2 in step S320. The first connection establishment response message may include information indicating an acceptance or rejection on the network for the D2D connection establishment request and a QoS parameter for the D2D connection. That is, in the embodiment of FIG. 5, the device 2 requests the device 1 to establish the D2D connection after the network accepts the D2D connection establishment. The embodiment of FIG. 5 shows a case where the network accepts the D2D connection establishment request of the device 2. The QoS parameter for the D2D connection may be included when QoS information requested for the D2D connection by the network is preferential over QoS information requested by the device 2.

Upon receiving the first connection establishment request message, the device 2 transmits a second connection establishment request message to the device 1 which is the target device of the D2D connection in step S330. The second connection establishment request message may include a QoS parameter for the D2D connection, security information, a D2D identifier, etc.

Upon receiving the second connection establishment request message, the device 1 transmits a second connection establishment response message to the device 2 in step S340. The second connection establishment response message indicates an acceptance or rejection on a D2D connection establishment request of the device 2. The embodiment of FIG. 5 shows a case where the device 1 accepts the D2D connection establishment request of the device 2.

Upon receiving the second connection establishment response message, the device 2 transmits a first connection establishment confirmation message to the device 1 in step S350, and transmits a second connection establishment confirmation message to the network in step S360. The first/second connection establishment confirmation message indicates whether a D2D connection establishment is finally successful according to the acceptance or rejection on the D2D connection establishment request of the device 1. Since the device 1 accepts the D2D connection establishment request in the embodiment of FIG. 5, the connection establishment confirmation message indicates the success of the D2D connection establishment.

In step S370, the device 1 and the device 2 perform a resource request and allocation procedure for data transmission. A D2D identifier transmitted by using the connection establishment request message can be used in a resource allocation. If the resource allocation is complete between the device 1 and the device 2, the device 1 and the device 2 transmit and receive data traffic in step S380.

Figure 6:
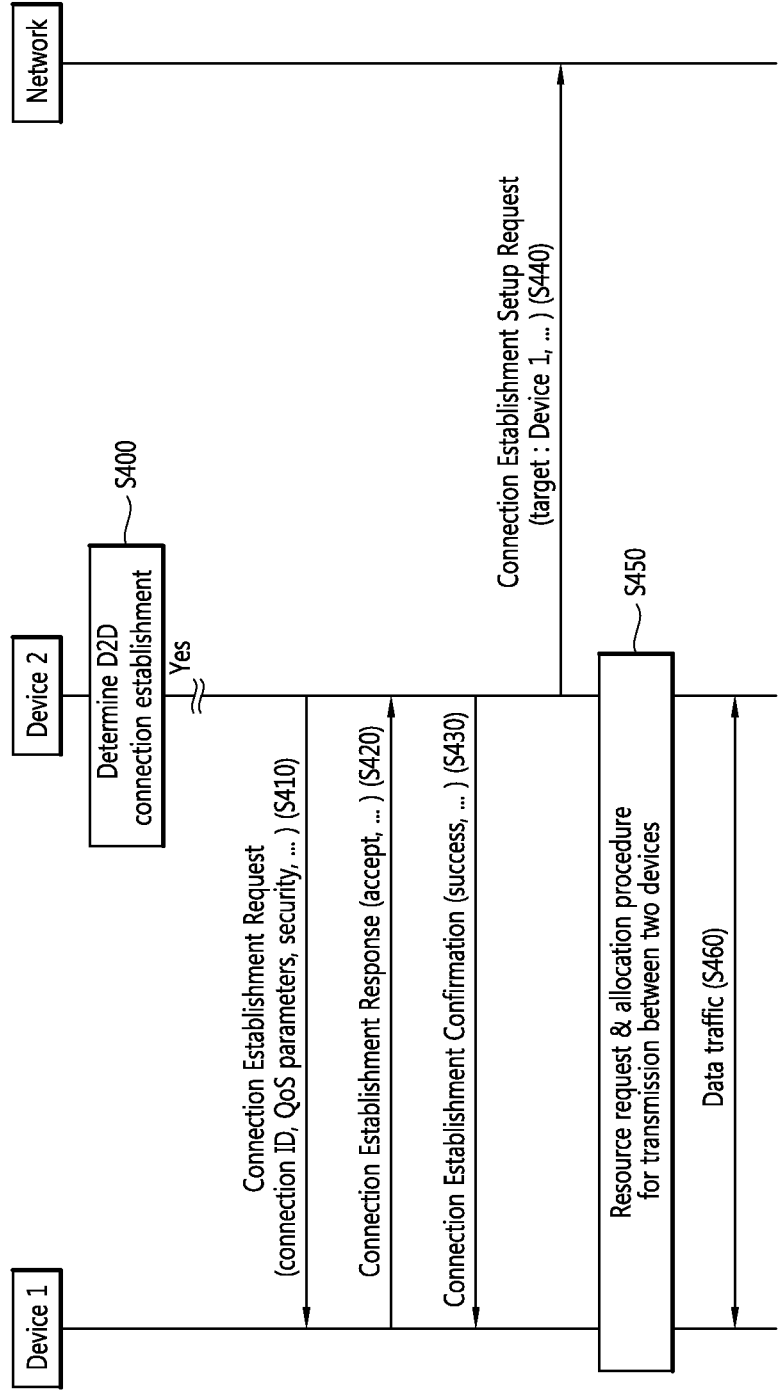
FIG. 6 shows another example of a D2D connection establishment method according to an embodiment of the present invention.

FIG. 6 shows another example of a D2D connection establishment method according to an embodiment of the present invention. The embodiment of FIG. 6 shows a case in which, when a D2D connection establishment is initiated by a device, the D2D connection establishment procedure is achieved in three steps.

Referring to FIG. 6, a device 2 determines whether to establish a D2D connection in step S400. The device 2 can request a network to perform the D2D connection establishment by determining a proximity with a communication target device, a presence of data to be transmitted and received with respect to the target device, a preference of the D2D connection establishment, etc, determined on the basis of a neighbor device's profile acquired through a neighbor discovery procedure. It is assumed in the embodiment of FIG. 6 that the target device is a device 1.

In step S410, the device 2 transmits a connection establishment request message to the device 1. The connection establishment request message may include a QoS parameter for the D2D connection, security information, a D2D identifier, etc.

Upon receiving the connection establishment request message, the device 1 transmits a connection establishment response message to the device 2 in step S420. The connection establishment response message indicates an acceptance or rejection on a D2D connection establishment request of the device 2. The embodiment of FIG. 6 shows a case where the device 1 accepts the D2D connection establishment request of the device 2.

Upon receiving the connection establishment response message, the device 2 transmits a connection establishment confirmation message to the device 1 in step S430. The connection establishment confirmation message indicates whether a D2D connection establishment is finally successful according to the acceptance or rejection on the D2D connection establishment request of the device 1. Since the device 1 accepts the D2D connection establishment request in the embodiment of FIG. 6, the connection establishment confirmation message indicates the success of the D2D connection establishment.

In step S440, the device 2 transmits a connection establishment setup report message to the network. That is, after the connection establishment is complete with respect to the device 1, the device 2 can report this result to the network. The connection establishment setup report message may indicate that the target device of the D2D connection is the device 1.

In step S450, the device 1 and the device 2 perform a resource request and allocation procedure for data transmission. A D2D identifier transmitted by using the connection establishment request message can be used in a resource allocation. If the resource allocation is complete between the device 1 and the device 2, the device 1 and the device 2 transmit and receive data traffic in step S460.

Meanwhile, an additional D2D connection can be established between devices of which the D2D connection has already existed. For example, the additional D2D connection can be established between the devices when a QoS property is different from that of the existing D2D connection. In this case, information of each device for the additional D2D connection establishment may have already been acquired by the aforementioned D2D connection establishment procedure. Therefore, if information and/or parameters of each device for additional D2D connection establishment is set to the same as information and/or parameters of each device for the existing D2D connection establishment, messages and/or parameters included in the messages according to the embodiment of the present invention described above can be partially omitted.

Figure 7:
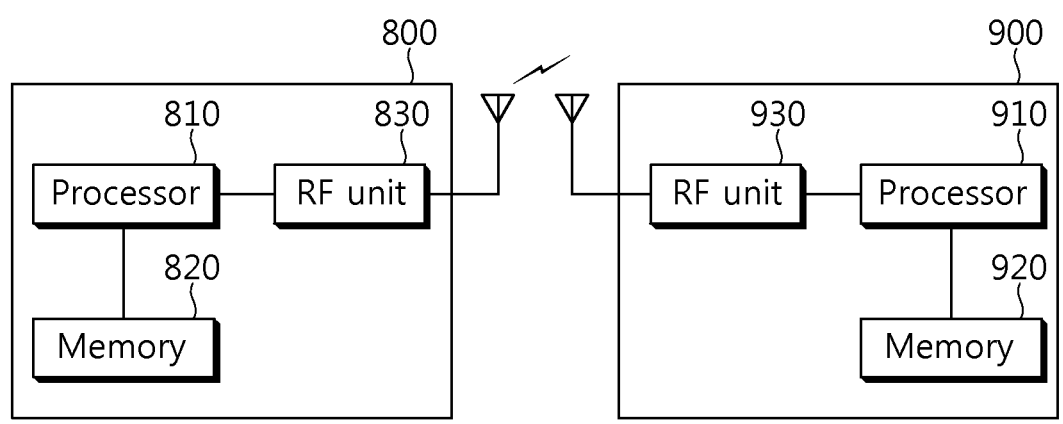
FIG. 7 is a block diagram showing wireless communication system to implement an embodiment of the present invention.

FIG. 7 is a block diagram showing wireless communication system to implement an embodiment of the present invention.

A base station 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A device 900 includes a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for establishing, by a first device, a device-to-device (D2D) connection with a second device in a wireless communication system, the method comprising:
   determining whether to establish the D2D connection with the second device or not, based on at least one of a proximity between the first device and the second device based on a profile of the second device obtained through a neighbor discovery procedure, a presence of data to be transmitted to the second device, and a preference for the D2D connection of the first device;
   transmitting a first connection establishment request message to request of the D2D connection establishment to a network if it is determined to establish the D2D connection with the second device;

receiving a first connection establishment response message indicating whether the request of the D2D connection establishment is accepted or rejected, from the network; and requesting the D2D connection establishment to the second device if the request of the D2D connection establishment is accepted by the network.

2. The method of claim 1, wherein the first connection establishment request message includes information on the second device and a quality of service (QoS) parameter for the D2D connection.

3. The method of claim 2, wherein the information on the second device includes an identifier of the second device.

4. The method of claim 3, wherein the identifier of the second device is one of a cell radio network temporary identifier (C-RNTI) or a station identifier (STID).

5. The method of claim 1, wherein the first connection establishment response message includes a QoS parameter for the D2D connection.

6. The method of claim 1, wherein requesting the D2D connection establishment to the second device comprises:

transmitting a second connection establishment request message to request of the D2D connection establishment to the second device;

receiving a second connection establishment response message indicating whether the request of the D2D connection establishment is accepted or rejected, from the second device.

7. The method of claim 6, wherein the second connection establishment request message includes at least one of a QoS parameter for the D2D connection, security information, and a D2D identifier.

8. The method of claim 7, wherein the D2D identifier is a link level D2D identifier allocated to a physical link between the first device and the second device.

9. The method of claim 7, wherein the D2D identifier is a connection/flow level D2D identifier allocated to a logical link between the first device and the second device.

10. The method of claim 6, if the request of the D2D connection establishment is accepted by the second device, further comprising:

transmitting connection establishment confirm message to the network and the second device.

11. The method of claim 6, further comprising:

allocating resources for transmission of data to the second device; and transmitting the data to the second device.

12. The method of claim 1, further comprising performing a neighbor discovery procedure.

* * * * *